(12) United States Patent
Thevenin

(10) Patent No.: US 6,268,591 B1
(45) Date of Patent: Jul. 31, 2001

(54) SAFETY AND/OR CONTROL DEVICE FOR ELECTRIC COOKING APPLIANCE

(75) Inventor: Jean-Marie Thevenin, Bourberain (FR)

(73) Assignee: SEB S.A., Ecully (FR)

( * ) Notice: Subject to any disclaimer, the term of this patent is extended or adjusted under 35 U.S.C. 154(b) by 0 days.

(21) Appl. No.: 09/510,222

(22) Filed: Feb. 22, 2000

(30) Foreign Application Priority Data

Feb. 19, 1999 (FR) .................................................. 99 02260

(51) Int. Cl.⁷ .............................. A47J 37/12; H01H 3/16; H01H 37/32
(52) U.S. Cl. ........................... 219/414; 219/435; 219/441; 219/518
(58) Field of Search ..................................... 219/414, 429, 219/432, 433, 435, 441, 518; 362/802

(56) References Cited

U.S. PATENT DOCUMENTS 4,164,644 * 8/1979 Remsnyder et al. .................. 219/433
5,823,095 * 10/1998 Walker ................................. 219/518

FOREIGN PATENT DOCUMENTS

| 528 656 | 2/1993 | (EP) . |
| 2 055 248 | 2/1981 | (GB) . |
| 2 222 025 | 2/1990 | (GB) . |
| 96 05761 | 2/1996 | (WO) . |

* cited by examiner

Primary Examiner—Joseph Pelham
(74) Attorney, Agent, or Firm—Browdy & Neimark

(57) ABSTRACT

A safety and/or control device for an electric cooking appliance, the appliance having a case defining a cooking enclosure and a component for heating the enclosure. The device includes: at least one switch arranged to close a circuit for supplying current to the heating component, this switch including a case and an actuating button, at least one sensing element which is movable between a safe position, corresponding to a predetermined configuration for placing the appliance into operation, and an unsafe position, corresponding to another configuration in which the appliance should not be placed into operation, and, optionally, a control unit accessible from outside the case and movable between an on position and an off position. The switch can be operated to close the current supply circuit in response to the sensing element and the control unit, or in response to two sensing elements, when the element and the control unit or both sensing elements are each in a defined position. Alternatively, the sensing element can have a transmission element which cooperates with the switch to close the current supply circuit in response to any of the conditions mentioned above.

18 Claims, 6 Drawing Sheets

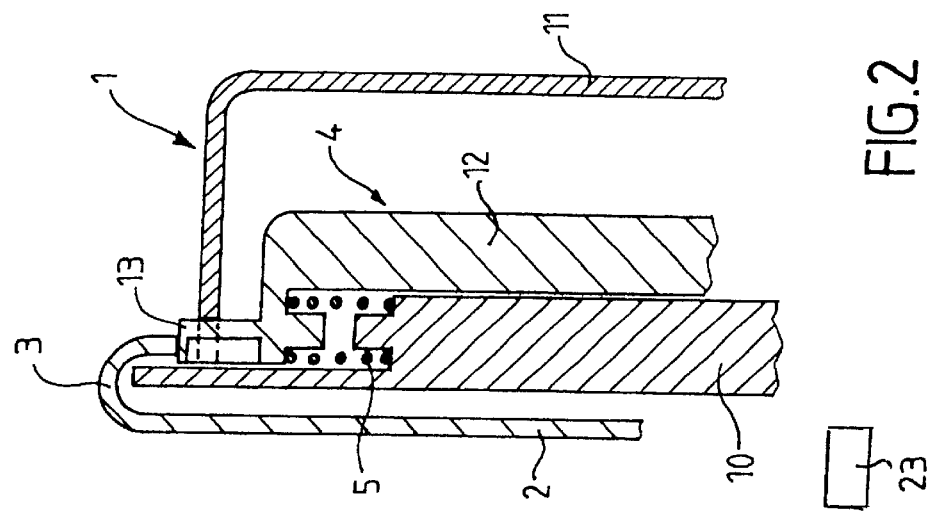
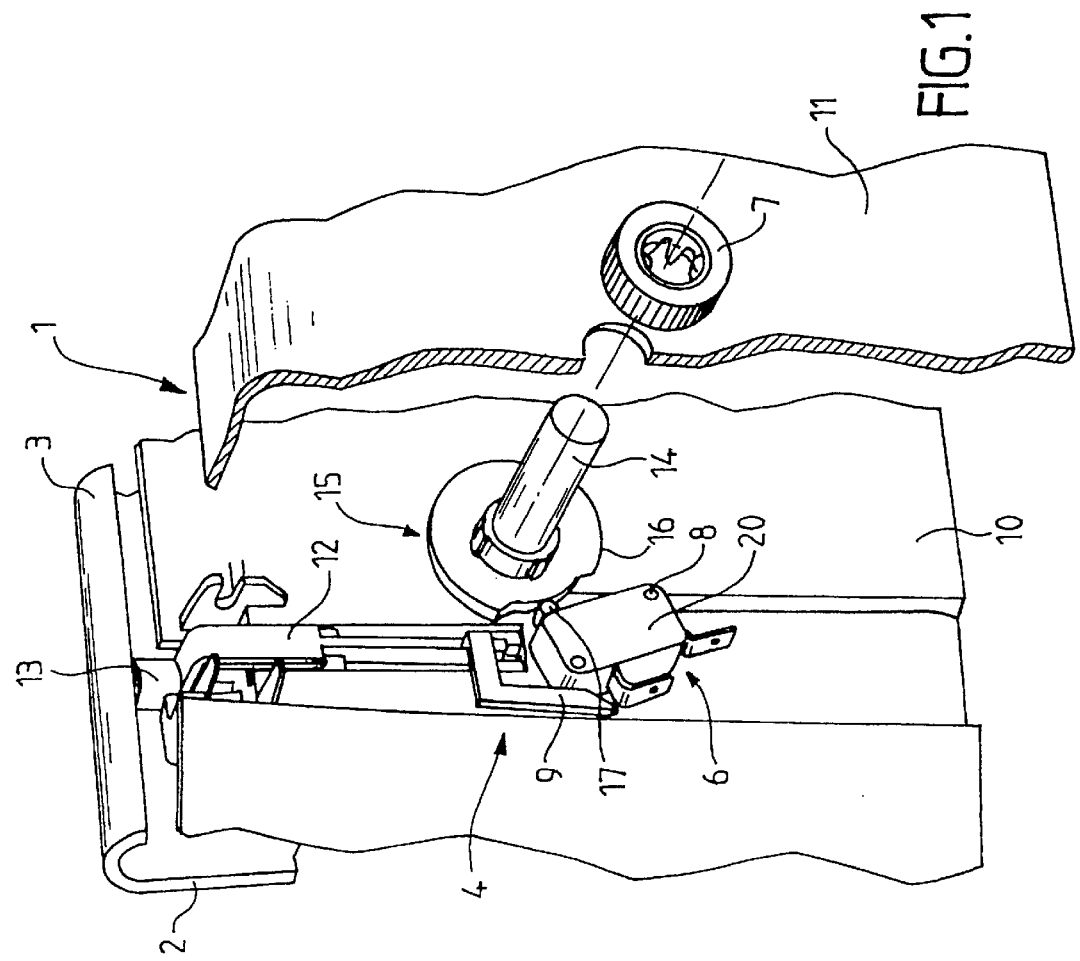

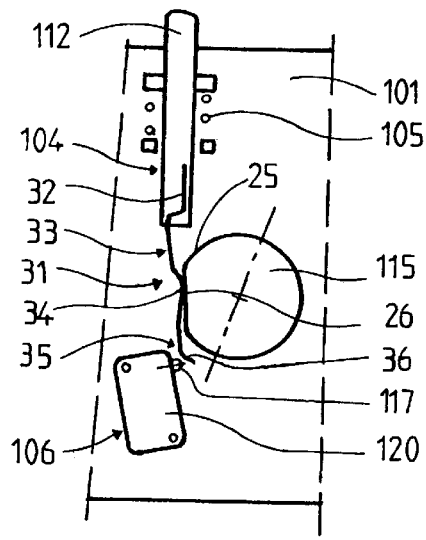
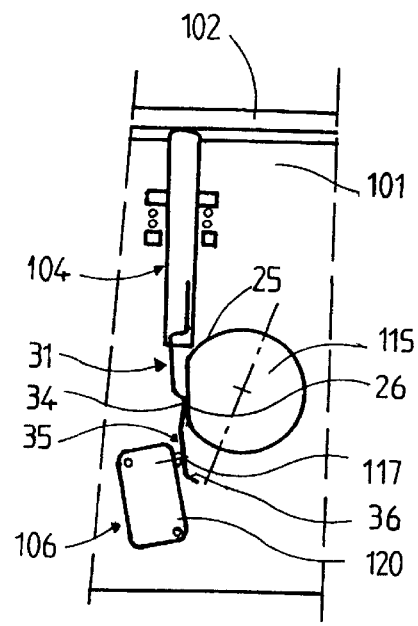
Fig. 8a Fig. 8b
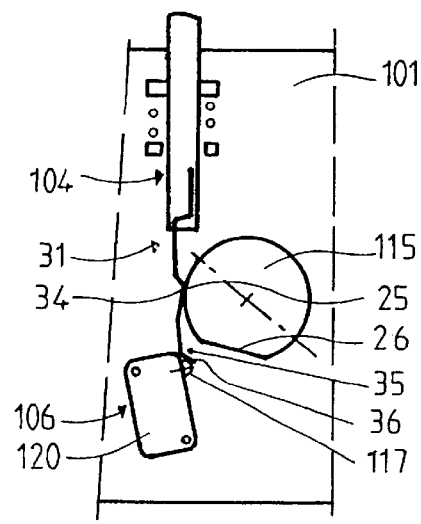
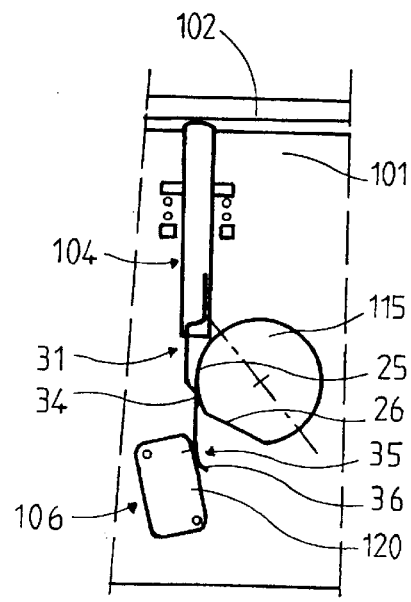
Fig. 8c Fig. 8d

SAFETY AND/OR CONTROL DEVICE FOR ELECTRIC COOKING APPLIANCE

BACKGROUND OF THE INVENTION

The present invention relates to the general technical field of electric cooking appliances of the type having a cooking enclosure as well as a movable or removable element, such as for example a removable bowl, a lid, or even a door, and heating means. The present invention is more particularly, but not exclusively, directed to electric fryers. The invention concerns specifically safety and/or control devices for such appliances.

It is known to manufacture electric fryers with a removable bowl in which the heating means are mounted at the bottom of a case provided to receive the removable bowl. In order to prevent such an appliance from operating in the absence of a bowl or in the presence of an incorrectly positioned bowl, it is known to equip the appliance with a device for detecting the presence of the bowl, this device including a switch provided to interrupt the supply of current to the heating means if the bowl is not present, or is not correctly positioned, in the case. It is also known to provide electric cooking appliances with a main on-off switch.

The patent document GB 2 222 025 discloses a safety and/or control device for an electric appliance, the appliance having an enclosure associated with heating means mounted in a removable manner on a current supply base. The safety and/or control device includes at least one switch arranged to close the supply circuit of the heating means, this switch including a case and an actuating button, or actuator, a sensing element movable between a first, heating, position and a second, off, position, and a control means accessible from outside of the case and movable between an on position and an off position. The appliance also includes a bistable actuator cooperating with the switch. The actuator is controlled by the sensing element, the control means and a camming surface of the base. Such an arrangement is expensive to fabricate when it is desired to control a switch by two sensing elements or a control element.

BRIEF SUMMARY OF THE INVENTION

It is an object of the present invention to simplify the structure and reduce the cost of manufacture of electric cooking appliances of the type described above.

The above and other objects are achieved by a safety and/or control device for an electric cooking appliance, the appliance having a case defining a cooking enclosure and means for heating the enclosure, the device comprising:

at least one switch arranged to close a circuit for supplying current to the heating means, this switch including a case and an actuating button, at least one sensing element which is movable between a first position, called a "safe" position, corresponding to a predetermined configuration for placing the appliance into operation, and a second position, called an "unsafe" position, corresponding to another configuration in which the appliance should not be placed into operation, and if desired, a control means accessible from outside the case and movable between an on position and an off position, wherein the case of the switch is movably mounted in such a manner as to be capable of being displaced, by the control means while the control means move into the on position, or by the sensing element, from a non-active position of the case of the switch in which the switch is in an open or closed state and an active position of the case of the switch in which the switch is pivoted into another one of the closed and open states by the sensing element as the sensing element moves into its safe position, or as the control means moves into its on position, or in response to another detection element moving into its safe position.

These arrangements particularly permit the use of a device for detecting the presence of a bowl also as a main on-off switch of the appliance, or even to utilize a common switch for a device for detecting the presence of the bowl and a device for detecting the closing of a lid.

According to one embodiment, the case of the switch is mounted to be free to rotate about an axis, the sensing element in its safety position is arranged to act on the case, or the actuator button, of the switch, the control means in its on position or the other sensing element in its safety position are then capable of acting on the actuator button, or the case of the switch.

Advantageously, then, the case of the appliance is made of a plastic material and the axis of rotation is defined by molding a pivot shaft on that case.

Then, according to another feature of the invention, the control means are mounted to rotate and include a cam capable, in the on position of the control means to actuate the actuating button, or the case, of the switch, when the sensing element is in its safe position.

According to another embodiment, the case of the switch is mounted on the control means, or on one of the sensing elements, the actuating button of the switch is capable of being actuated by the sensing element, or the control means, or the other sensing element.

Objects according to the invention are further achieved by a safety and/or control device for an electric cooking appliance, the appliance having a case defining a cooling enclosure and means for heating the enclosure, the device comprising:

at least one switch arranged to close a circuit for supplying current to the heating means, this switch including a case and an actuating button, at least one sensing element which is movable between a first position, called a "safe" position, corresponding to a predetermined configuration for placing the appliance into operation, and a second position, called an "unsafe" position, corresponding to another configuration in which the appliance should not be placed into operation, and if desired, a control means accessible from outside the case and movable between an on position and an off position, wherein a transmission element mounted on the sensing element, or on the control means, has a movable part including a control zone, displaceable by the control means or another sensing element, or the first-mentioned sensing element, and an actuation zone capable of cooperating with the switch when, on the one hand, the sensing element is in the safe position and, on the other hand, the control means is in the on position or when the other sensing element is in its safe position, the transmission element then occupying an active position in which the switch is in an open or closed state, the switch being in its other state when the first-mentioned sensing element is in the unsafe position, or when the control means is in the stop position, or when the other sensing element is in the unsafe position, the actuation zone then being capable of cooperating with the switch.

These arrangements also permit use of a device for detecting the presence of a bowl also as a main switch for turning the appliance on and off, or even utilizing a common switch for a device for detecting the presence of a bowl and a device for detecting the closing of a lid.

Advantageously, the actuation zone includes a cam surface extending transversely to the direction of displacement of the actuation zone between the position occupied by the actuation zone when, on the one hand, the sensing element is in the unsafe position and, on the other hand, the control means is in the stop position, or when the other sensing element is in the unsafe position, and the position occupied by the actuation zone when, on the one hand, the sensing element is in the safe position and, on the other hand, the control means are in the on position or the other sensing element is in the safe position.

This arrangement allows the actuation of the switch to be facilitated regardless of the order of actuation of the sensing element, or of the control means, or of the second sensing element.

According to one form of construction, the case of the switch is mounted in a fixed position in the case of the appliance and the actuation zone cooperates with the actuating button of the switch when the transmission element occupies the active position.

According to another form of construction, the case of the switch is mounted to be movable in the case of the appliance and the actuation zone cooperates with the case of the switch in order to push the actuating button of the switch against an abutment of the appliance case when the transmission element occupies its active position. Advantageously, in this form of construction, the case of the switch is mounted to be movable in rotation around an axis fixed to the case of the appliance.

Advantageously, the control means are capable of occupying several on positions.

The control means are advantageously formed by a control button, or dial, of a thermostat for setting a desired temperature. This construction eliminates the need to provide specialized control means for the on-off switch.

Preferred embodiments of the invention will be described below with reference to the drawings, it being understood that the scope of this invention is not limited by the specific illustrations provided.

BRIEF DESCRIPTION OF THE SEVERAL VIEWS OF THE DRAWINGS

FIG. 1 is a perspective, exploded, detail view illustrating one embodiment of a device according to the invention.

FIG. 2 is a cross-sectional detail view illustrating the upper part of the device shown in FIG. 1.

FIGS. 8a–8d are simplified pictorial views of a fourth embodiment of a device according to the invention, shown in four different operating positions.

DETAILED DESCRIPTION OF THE INVENTION

Figure 3:
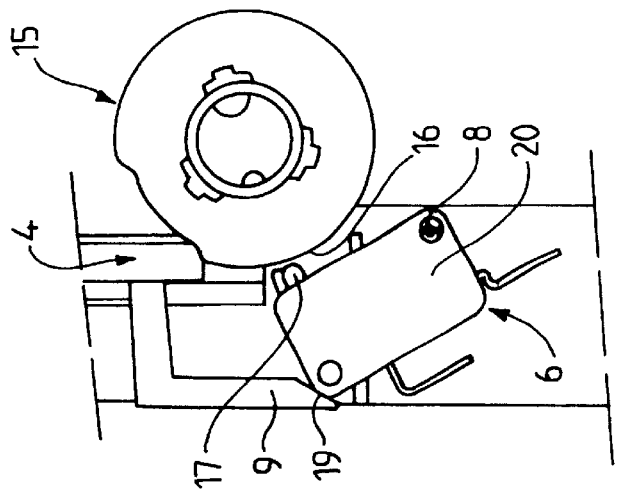
FIGS. 3, 4 and 5 are elevational detail views showing three operating positions of the device shown in FIGS. 1 and 2.

FIG. 1 shows a control and safety device according to the invention in an electric cooking appliance which has a case 1 that forms a housing provided to receive a removable bowl 2, only a portion of case 1 and the upper edge of the lateral wall of bowl 2 being shown.

It would be understood that a complete bowl 2 will extend downwardly from the portion shown and will include a closed bottom. Case 1 is composed of an inner wall 10 delimiting the housing for receiving bowl 2, and an outer wall 11. Elements such as a thermostat or a thermal fuse will be installed in the space provided between walls 10 and 11.

The control and safety device according to the invention includes a sensing element 4 which senses, or responds to, the presence of bowl 2 in a manner which will be described below. Sensing element 4 is disposed in case 1 between walls 10 and 11 and includes a shaft 12 slidably mounted in case 1. Shaft 12 carries a lug 13 provided to cooperate with a folded-over a lip, or edge, 3 of the bowl 2 and a foot 9 provided to cooperate with a switch 6. Lug 13 thus provides a zone for sensing the presence of bowl 2 and foot 9 provides a zone for actuating switch 6. FIG. 2 shows sensing element 4 movably mounted against the restoring action of a restoring, or bias, means 5, such as a spring.

When bowl 2 is present, and properly positioned, in the housing provided by case 1, sensing element 4 is caused to descend into a first position in which switch 6 is able to close a circuit which supplies electric current to heating means 14 of the appliance.

If bowl 2 is not present or if it is not properly positioned in case 1, sensing element 4 occupies a second, elevated, position corresponding to the position produced when means 5 alone acts on sensing element 4. When sensing element 4 is in this second position, switch 6 will be in a position to open the circuit which supplies current to the heating means.

Switch 6 is associated with a control means 15 accessible from outside case 1, control means 15 being positionable to occupy either an on position, in which switch 6 is able to be acted upon by the actuation zone of sensing element 4 when bowl 2 is properly seated in the housing in order to close the current supply circuit for the heating means, or an off position in which switch 6 opens the current supply circuit.

As shown in FIG. 1, control means 15 includes a wheel which carries a cam 16 mounted to be movable in rotation in case 1 about an axis defined by a shaft 14. Shaft 14 carries, at one end, a button 7 which is rotatable by a user from the exterior of the appliance. Switch 6 is advantageously mounted to be rotatable about an axis defined by a shaft 8 which is fastened to, and extends from, wall 10. Foot 9 is arranged to pivot switch 6 between first and second positions. Preferably, case 1 is made of a plastic material and shaft 8 is formed as an integral part of wall 10 when the latter is molded.

Figure 4:
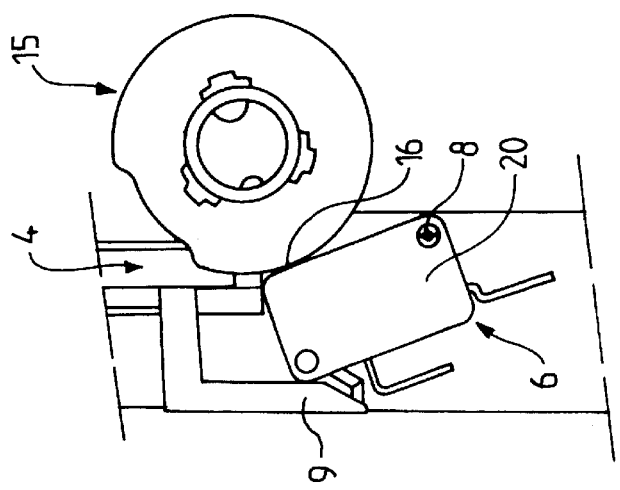
Figure 5:
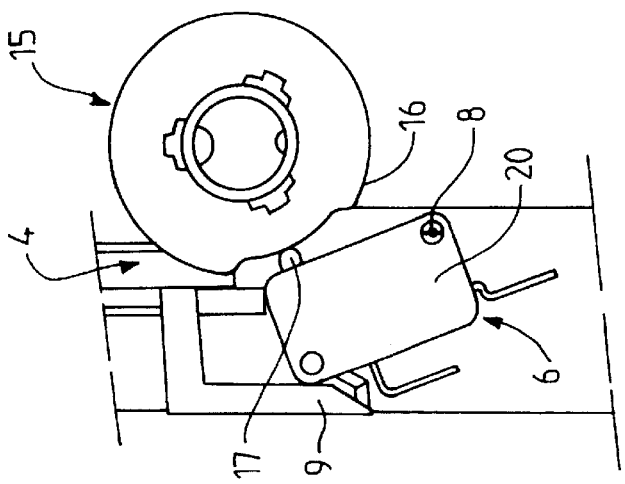

As better shown in FIGS. 3–5, switch 6 has a switch case 20 and an actuating button 17 arranged to cooperate with cam 16.

According to one variation (not shown), actuating button 17 could cooperate with foot 9 of sensing element 4, while case 20 of switch 6 then cooperates with cam 16. According to another variation (not shown), control means 15 could be movable in translation and could control, for example, shaft 14 by the intermediary of a rack.

In the state shown in FIG. 3, sensing element 4 occupies its depressed position in that bowl 2 is properly installed in the housing defined by case 1, and control means 15 occupies the off position. Case 20 of switch 6 comes to bear against foot 9 and actuating button 17 assumes a released position in which the circuit for supplying current to the heating means is open circuited.

In the condition shown in FIG. 4, sensing element 4 occupies the same position as in the state shown in FIG. 3, but control means 15 occupy the on position. Case 20 of switch 6 comes bear against foot 9 and actuating button 17 is pushed down by cam 16 to occupy a depressed position in which the current supply circuit is close circuited so as to supply heating current to the heating means. It will be noted that the raised surface portion of cam 16 has a substantial peripheral extent to permit control means 15 to have several on positions. This control means could, for example, be associated with a control button, or dial, for setting a thermostat to an adjustable temperature.

In the state shown in FIG. 5, sensing element 4 occupies the position in which bowl 2 is absent or is not properly positioned and control means 15 is in an on position. Case 20 of switch 6 comes to bear against a beveled edge 19 of foot 9 and actuating button 17 is in the released position in which the current supply circuit is open circuited.

The device shown in FIGS. 1–5 operates and is employed in the following manner. During displacement of control means 15 from the off position to an on position, cam 16 is in a position to tend to depress actuating button 17. If bowl 2 is properly seated in the housing provided by case 1, foot 9 pivots switch 6 toward cam 16 so that actuating button 17 is depressed and the circuit supplying electric current to the heating means is close circuited.

If bowl 2 is not present or is not properly positioned, bias means 5 push sensing element 4 upwardly into its second position. Switch then comes to bear on beveled edge 19 of foot 9, so that cam 16 can no longer depress actuating button 17. The current supply circuit for the heating means thus remains open circuited.

If bowl 2 is properly positioned in the housing provided by case 1, sensing element 4 is depressed into its first position against the restoring force provided by bias means 5 and foot 9 pushes switch 6 against cam 16. Actuating button 17 is then depressed and the current supply circuit is closed so that the appliance is placed into operation.

Figure 6:
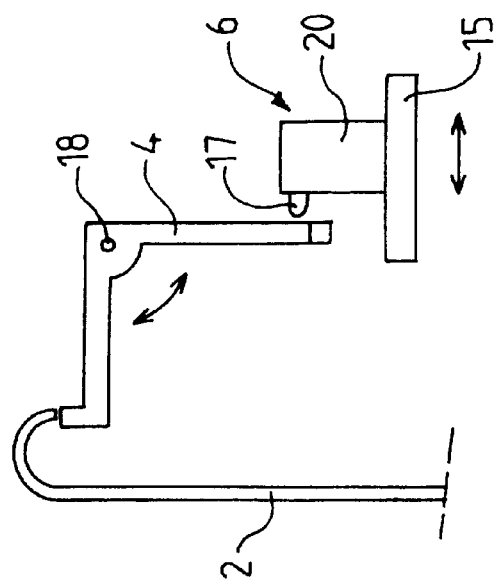
FIG. 6 is a simplified, pictorial, elevational view of a second embodiment of a device according to the invention.

FIG. 6 shows an embodiment which includes a sensing element 4' mounted for rotation about an axis defined by a shaft 18 extending from either wall 10 or 11 of case 1. Sensing element 4' is pivotable in opposition to a restoring force provided by a suitable bias means (not shown). A control means 15' is movable in translation, in the direction indicated by the double headed arrow, between an on position and an off position, the latter position being shown in FIG. 6. A case 20' of a switch 6' is fixed to control means 15'. The current supply circuit for the heating means is close circuited when actuating button 17' of switch 6' is depressed and is open circuited when actuating button 17 is released.

The operation of the embodiment shown in FIG. 6 is comparable to that of the previously described embodiments. When bowl 2 is properly positioned in the housing defined by case 1 and the control means 15' occupy an on position, which is to the left of the position shown in FIG. 6, bowl 2 pivots sensing element 4' in a direction to depress actuating button 17 so that electric current is supplied to the heating means. If bowl 2 is not present or is not properly positioned, or if control means 15' occupy the off position, actuating button 17' will not contact sensing element 4'. Therefore, actuating button 17' is released and electric current is not supplied to the heating means.

Figure 7:
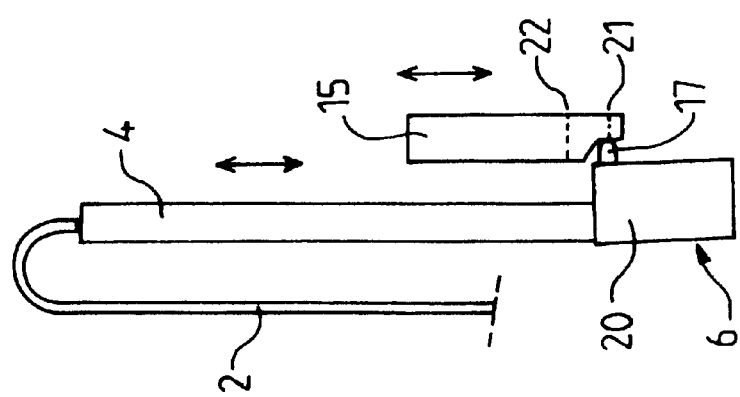
FIG. 7 is a view similar to that of FIG. 6 showing a third embodiment of a device according to the invention.

In the embodiment shown in FIG. 7, there is provided a detection element 4" which is vertically movable against the restoring force of a bias spring (not shown) and control means 15' are movable vertically between on and off positions. A case 20" of a switch 6" is fixed to sensing element 4" and includes an actuating button 17". In this embodiment, the circuit for supplying electric current to the heating means is closed when actuating button 17 is in its released position, as shown. The current supply circuit is open circuited when actuating button 17 is depressed. Control means 15" are capable of occupying an off position in which actuating button 17" contacts control means 15" at or above the level of a line 22, and is thus depressed. Control means 15" can also be moved to an on position, which is the position illustrated in FIG. 7. In this position, when bowl 2 is properly positioned in case 1, actuating button 17 will contact control means 15" at the level of line 21. Therefore, actuating button 17" will be released and electric current will be supplied to the heating means. When control means 15" are in the on position and bowl 2 is absent from, or not properly positioned in, case 1, sensing element 4" and case 6" will be displaced upwardly, so that actuating button 17" will contact control means 15" at, for example, the level of line 22, and actuating button 17" will therefore be depressed, opening the current supply circuit for the heating means.

The operation of a device according to the embodiment of FIG. 7 will be essentially the same as that for the preceding embodiments, from the point of view of the user. When bowl 2 is properly seated in case 1 and control means 15" occupy the on position, actuating button 17" is released and the heating means are supplied with electric current. If bowl 2 is not present or if control means 15" occupy their off position, actuating button 17" will be depressed by control means 15" so that the heating means will not be supplied with electric current.

The embodiment shown in FIGS. 8a to 8d is associated with an appliance having a case 101 and a removable bowl 102. A sensing element 104 is mounted to be movable in translation in case 101. Sensing element 104 includes a shaft 112 mounted for sliding movement within case 101 against a return, or biasing, means 105, such as a spring. Sensing element 104 is movable between a raised position, into which it is urged by return means 105, which position is shown in FIGS. 8a and 8c, and a lowered position which exists when bowl 102 is properly positioned in the case, the latter position being shown in FIGS. 8b and 8d. When bowl 102 is properly positioned in case 101, bowl 102 pushes sensing element 104 downwardly against the restoring action of return means 105. The raised position of sensing element 104 corresponds to the unsafe position and the lowered position of sensing element 104 corresponds to the safe position.

Control means 115 are mounted in case 101 to be rotatable about an axis that is fixed to case 101 between an off position shown in FIGS. 8a and 8b and an on position, shown in FIGS. 8c and 8d. Control means 115 include a disk having a circular peripheral portion 25 and a flat portion 26. Control means 115 can occupy several on positions in addition to those shown in FIGS. 8c and 8d. The periphery of the disk forming part of control means 115 is circular outside of flat portion 26, and it is for this reason that the control means can have several on positions which can be associated, for example, with a control for the temperature setting of a thermostat.

The embodiment shown in FIGS. 8a–8d further includes a transmission element 31 connected to sensing element 104. Transmission element 31 is formed by a piece having a certain degree of flexibility and having a part 32 that is fixed to shaft 112 and a part 33 which extends from shaft 112 and is movable laterally of the direction of movement of sensing element 104. Movable part 33 includes a control zone 34 arranged to cooperate with the disk forming part of control means 115 and an actuating zone 35 arranged to cooperate with a switch 106 mounted in case 101.

Switch 106 includes a switch case 120 fixed to case 101 and an actuating button 117 disposed to cooperate with actuating zone 35. Actuating zone 35 has a camming surface 36 which extends in a direction transverse to the direction of displacement of actuating zone 35 between, on the one hand, the position occupied when sensing element is in the unsafe position and control means 115 are in the off position, represented in FIG. 8a, and, on the other hand, the position occupied when sensing element 104 is in the safe position and control means 115 are in the on position, as shown in FIG. 8d, in order to facilitate actuation of actuating button 117.

The operation of this embodiment is the following. Sensing element 104 displaces transmission element 31 in a first direction which is substantially vertical and control means 115 displace transmission element 31 in a second direction which is substantially horizontal.

Transmission element 31 is in a raised position when detection element 104 is in a raised position, such as shown in FIGS. 8a and 8c, and in a lowered position when sensing element is in a lowered position in the presence of bowl 102, shown in FIGS. 8b and 8d.

Transmission element 31 is in an undeformed condition when flat portion 26 engages control zone 34, as shown in FIGS. 8a and 8b, and in a horizontally deformed position when circular periphery 25 engages control zone 34, as shown in FIGS. 8c and 8d.

Transmission element 31 cooperates with actuating button 117 when sensing element 104 is in the safe position and control means 115 are in the on position, as shown in FIG. 8d. Transmission element 31 is then in an active position.

Transmission element 31 does not depress actuating button 117 when detection element 104 is in its unsafe position or when control means 115 are in the off position, as shown in FIGS. 8a and 8c.

Figure 9A:
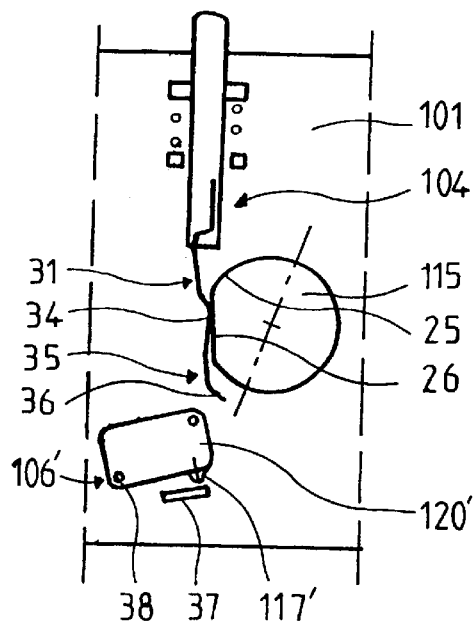
FIGS. 9a–9b are views similar to those of FIG. 8 showing a fifth embodiment of a device according to the invention in two different operating positions.
Figure 9B:
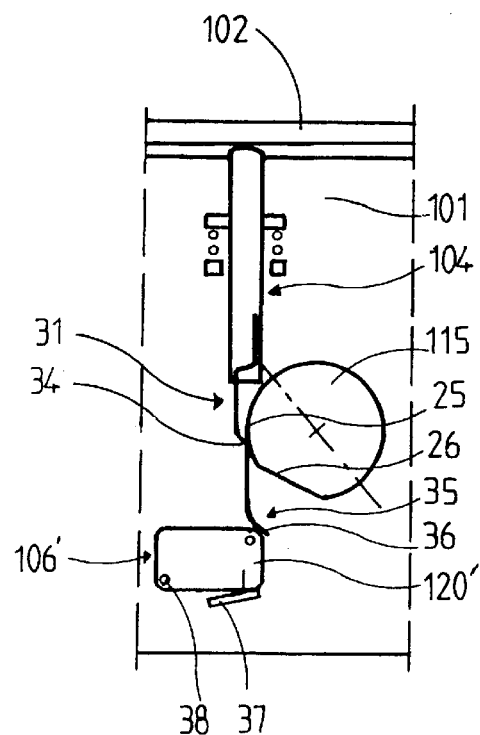

The embodiment shown in FIGS. 9a and 9b differs from the embodiment of FIGS. 8a–8d in that the embodiment of FIGS. 9a and 9b includes a switch 106' having a case 120' which is mounted in case 101 to be pivotable about an axis defined by a pin 38 that is fixed to case 101. Switch 106' further includes an actuating button 117' arranged to cooperate with an abutment 37 that is also fixed to case 101. Actuating zone 35 of transmission element 31 is arranged to cooperate with case 120' of switch 106'.

When transmission element 31 is in the active position, as shown in FIG. 9b, actuating zone 35 pushes case 120' downwardly to push actuating button 117' against abutment 37 in order to depress actuating button 117. When transmission element 131 is not in the active position, as shown in FIG. 9a, actuating zone 35 no longer presses on case 120' and case 120' can pivot, under the action of the restoring force of a spring associated with actuating button 117', so that actuating button 117' is no longer depressed and assumes its extended, or released, position.

Actuating zone 35 includes a camming surface 36 which extends transverse to the direction of displacement of actuating zone 35 between, on the one hand, the position occupied when sensing element 104 is in the unsafe position and control means 115 are in the off position, shown in FIG. 9a, and, on the other hand, the position occupied when sensing element 104 is in the safe position and control means 115 are in the on position, as shown in FIG. 9b, in a manner to facilitate pivoting of case 120' around the axis of pin 38 in order to cause actuating button 117' to interact with, and be depressed by, abutment 37.

Numerous improvements can be provided to the devices disclosed herein without departing from the framework of the invention.

The control means and the sensing element can be movable between two positions with a movement different from a rotational movement or a translational movement.

According to other embodiments of the invention, the control means can be replaced by a second sensing element. Two such embodiments are shown in FIGS. 10a and 10b.

Figure 10A:
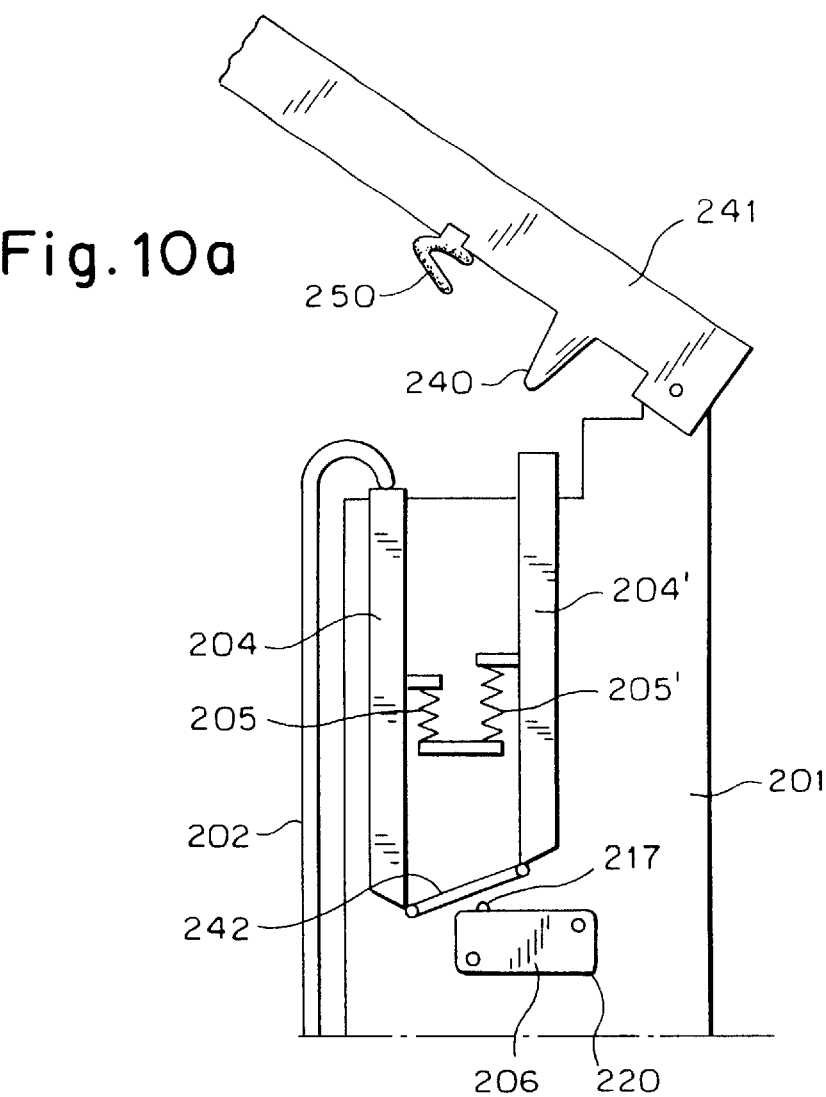
FIG. 10a is a simplified pictorial elevational view showing a sixth embodiment of a device according to the invention.
Figure 10B:
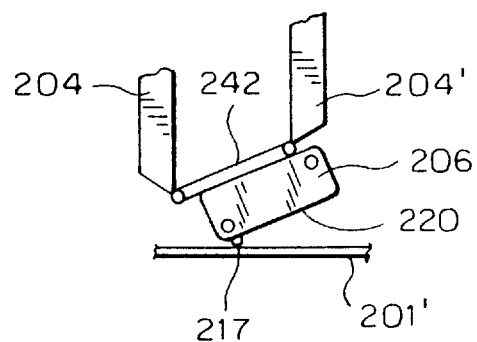
FIG. 10b is a simplified pictorial elevational detail view showing a part of a seventh embodiment of a device according to the invention which is a modification of the sixth embodiment.

FIG. 10a shows one such embodiment which includes a sensing element 204 that responds to the presence of a bowl 202 in the housing formed by case 201. When bowl 202 is properly positioned in the housing, sensing element 204 is displaced downwardly against the restoring force produced by a restoring means 205. A second sensing element 204', which is mounted for movement in the same manner element 204, is disposed to be displaced downwardly, against the restoring force produced by a restoring means 205', in response to or closing of a lid 241 of the appliance. Lid 241 carries a finger 240 which is positioned to engage sensing element 204' in order to move element 204' downwardly when lid 241 is moved to its closed position.

A switch 206 has a case 220 which is fixed to case 201 of the appliance. Switch 206 further has an actuating button 217 which faces upwardly and is normally in a released, or raised, position.

A bar-shaped actuating member 242 extends between sensing elements 204 and 204'. Actuating member 242 has two opposed ends, each of which is pivotally connected to a respective one of sensing elements 204 and 204'.

If either sensing element 204 or 204' is in its raised position, which is the position shown for element 204', actuating member 242 can not engage button 217. Only if both sensing elements 204 and 204' are in their depressed position will actuating member 242 bear against actuating button at 217 in order to move that button to its depressed position. When button 217 is moved to its depressed position, switch 206 acts to close the circuits for supplying current to the heating means of the appliance.

For FIG. 10a further shows, for the sake of completeness, a seal 250 that will engage the upper edge of bowl 202 when lid 241 is in its closed position.

FIG. 10b shows a variation which is identical to the embodiment of FIG. 10a, except for the following differences. In the embodiment of FIG. 10b, case 220 of switch 206 is fixed to actuating member 242, actuating button 217 is directed downwardly, and case 201 is provided with a part 201 ' having a surface against which actuating button 217 will come to bear, and which will move button 217 to its depressed position, only when both sensing elements 204 and 204' are in their respective depressed positions. In the case of each of the embodiments of FIGS. 10a and 10b, actuating button 217 of switch 206 will not be moved to its depressed position if bowl 202 is not correctly positioned in the housing defined by case 201, or if lid 241 is not in its closed position.

This application relates to subject matter disclosed in French Application number 99 02260, filed on Feb. 19, 1999, the disclosure of which is incorporated herein by reference.

While the description above refers to particular embodiments of the present invention, it will be understood that many modifications may be made without departing from the spirit thereof The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An operation control device for an electric cooking appliance, tile appliance having a case defining a cooking enclosure and heating means for heating the enclosure, the device comprising: a switch arranged to close a circuit for supplying current to the heating means, said switch including a case and an actuating button; a first component constituting a first sensing element movable between a first position, when the appliance is in a first configuration, for allowing the appliance to be placed into operation, and a second position, when the appliance is not in the first configuration, for preventing the appliance from being placed into operation; and a second component movable between a first position and a second position, said second component being one of—a control element movable between the first position and second position of the second component in response to operation from outside the appliance by a user; and a second sensing element movable into the first position of the second component when the appliance is in a second configuration, wherein said switch is operatively associated with said first and second components to be placed in an active position that allows said switch to close the circuit for supplying current to the heating means only when each of said components is in its first position, said case of said switch is movably mounted to be displaced by movement of one of said components between the first and second positions; and said case of said switch is mounted for rotation about a pivot axis that is fixed to the case of the cooking appliance, said first component, when in the first position, is arranged to act on said switch, and said second component, when in the first position, is arranged to act on said switch.

2. The device according to claim 1 wherein the case of the cooking appliance is made of a plastic material and includes a molded component having a pin defining the pivot axis.

3. The device according to claim 2 wherein said second component is a control element accessible from outside the case of the appliance and including a cam movable in rotation between the first position and the second position of said second component for acting on said switch when said first component is in the first position.

4. The device of claim 3 wherein said case of said switch is mounted on one of said components and said actuating button of said switch is arranged to be acted on by the other one of said components.

5. The device of claim 3 wherein said case of said switch is mounted on one of said components and said actuating button of said switch is arranged to be acted on by the other one of said components.

6. The device of claim 1 wherein said case of said switch is mounted on one of said components and said actuating button of said switch is arranged to be acted on by the other one of said components.

7. The device of claim 1 wherein said second component is a control element accessible from outside the case of the appliance and movable into a plurality of positions to close the circuit for supplying current to the heating means.

8. An operation control device for an electric cooking appliance, tile appliance having a case defining a cooking enclosure and heating means for heating the enclosure, the device comprising: a switch arranged to close a circuit for supplying current to the heating means, said switch including a case and an actuating button; a first component constituting a first sensing element movable between a first position, when the appliance is in a first configuration, for allowing the appliance to be placed into operation, and a second position, when the appliance is not in the first configuration, for preventing the appliance from being placed into operation; and a second component movable between a first position and a second position, said second component being one of—a control element movable between the first position and second position of the second component in response to operation from outside the appliance by a user; and a second sensing element movable into the first position of the second component when the appliance is in a second configuration, wherein:

said switch is operatively associated with said first and second components to be placed in an active position that allows said switch to close the circuit for supplying current to the heating means only when each of said components is in its first position, wherein:

said case of said switch is movably mounted to be displaced by movement of one of said components between the first and second positions; and said case of said switch is mounted on one of said components and said actuating button of said switch is arranged to be acted on by the other one of said components.

9. An operation control device for an electric cooking appliance, the appliance having a case defining a cooking enclosure and heating means for heating the enclosure, the device comprising: a switch arranged to close a circuit for supplying current to the heating means, said switch including a case and an actuating button; a first component constituting a first sensing element movable between a first position, when the appliance is in a first configuration, for allowing the appliance to be placed into operation, and a second position, when the appliance is not in the first configuration, for preventing the appliance from being placed into operation; and a second component movable between a first position and a second position, said second component being one of—a control element movable between the first position and second position of the second component in response to operation from outside the appliance by a user; and a second sensing element movable into the first position of the second component when the appliance is in a second configuration; and a transmission element carried, and movable into an active position, by one of said components and having a control zone that is displaceable by the other one of said components, said transmission element further having an actuation zone operatively associated with said switch for operating said switch to close the circuit only when each of said components is in its first position, wherein said second component is a control element accessible from outside the case of the appliance and movable into a plurality of positions to close the circuit for supplying current to the heating means, and said control element comprises a control button of a thermostat for setting the operating temperature of the cooking appliance.

10. An operation control device for an electric cooking appliance, the appliance having a case defining a cooking enclosure and heating means for heating the enclosure, the device comprising: a switch arranged to close a circuit for supplying current to the heating means, said switch including a case and an actuating button; a first component constituting a first sensing element movable between a first position, when the appliance is in a first configuration, for allowing the appliance to be placed into operation, and a second position, when the appliance is not in the first configuration, for preventing the appliance from being placed into operation; and a second component movable between a first position and a second position, said second component being one of—a control element movable between the first position and second position of the second component in response to operation from outside the appliance by a user; and a second sensing element movable into the first position of the second component when the appliance is in a second configuration; and a transmission element carried, and movable into an active position, by one of said components and having a control zone that is displaceable by the other one of said components, said transmission element further having an actuation zone operatively associated with said switch for operating said switch to close the circuit only when each of said components is in its first position, wherein said actuation zone is displaceable in a displacement direction between an actuation position when both of said components are in the first position and a deactuation position when both of said components are in the second position, and said actuation zone has a camming surface extending transverse to the displacement direction of said actuation zone.

11. The device of claim 10 wherein said case of said switch is mounted in a fixed position relative to the case of the cooling appliance and said actuation zone cooperates with said actuating button of said switch when said transmission element occupies the active position.

12. The device of claim 10 wherein said case of said switch is mounted to be movable relative to the case of the cooking appliance and said actuation zone cooperates with said case of said switch to press said actuating button of said switch against an abutment fixed to the case of the cooking appliance when said transmission element occupies the active position.

13. The device of claim 12 wherein said case of said switch is mounted for movement in rotation about an axis that is stationary relative to the case of the cooking appliance.

14. The device of claim 12 wherein said case of said switch is mounted in a fixed position relative to the case of the cooking appliance and said actuation zone cooperates with said actuating button of said switch when said transmission element occupies the active position.

15. The device of claim 10 wherein said second component is a control element accessible from outside the case of the appliance and movable into a plurality of positions to close the circuit for supplying current to the heating means.

16. An operation control device for an electric cooking appliance, the appliance having a case defining a cooking enclosure and heating means for heating the enclosure, the device comprising: a switch arranged to close a circuit for supplying current to the heating means, said switch including a case and an actuating button; a first component constituting a first sensing element movable between a first position, when the appliance is in a first configuration, for allowing the appliance to be placed into operation, and a second position, when the appliance is not in the first configuration, for preventing the appliance from being placed into operation; and a second component movable between a first position and a second position, said second component being one of—a control element movable between the first position and second position of the second component in response to operation from outside the appliance by a user; and a second sensing element movable into the first position of the second component when the appliance is in a second configuration; and a transmission element carried, and movable into an active position, by one of said components and having a control zone that is displaceable by the other one of said components, said transmission element further having an actuation zone operatively associated with said switch for operating said switch to close the circuit only when each of said components is in its first position wherein said case of said switch is mounted to be movable relative to the case of the cooking appliance and said actuation zone cooperates with said case of said switch to press said actuating button of said switch against an abutment fixed to the case of the cooking appliance when said transmission element occupies the active position.

17. The device of claim 16 wherein said case of said switch is mounted for movement in rotation about an axis that is stationary relative to the case of the cooking appliance.

18. An operation control device for an electric cooking appliance, the appliance having a case defining a cooking enclosure and heating means for heating the enclosure, the device comprising: a switch arranged to close a circuit for supplying current to the heating means, said switch including a case and an actuating button; a first component constituting a first sensing element movable between a first position, when the appliance is in a first configuration, for allowing the appliance to be placed into operation, and a second position, when the appliance is not in the first configuration, for preventing the appliance from being placed into operation; and a second component movable between a first position and a second position, said second component being one of—a control element movable between the first position and second position of the second component in response to operation from outside the appliance by a user; and a second sensing element movable into the first position of the second component when the appliance is in a second configuration; and a transmission element carried, and movable into an active position, by one of said components and having a control zone that is displaceable by the other one of said components, said transmission element further having an actuation zone operatively associated with said switch for operating said switch to close the circuit only when each of said components is in its first position, wherein:

said second component is a control element accessible from outside the case of the appliance and movable into a plurality of positions to close the circuit for supplying current to the heating means, and said control element comprises a control button of a thermostant for setting the operating temperature of said cooking appliance.

* * * * *